US008722800B2

(12) United States Patent
Oda et al.

(10) Patent No.: US 8,722,800 B2
(45) Date of Patent: May 13, 2014

(54) COMPOSITION FOR STRETCHABLE FILM

(75) Inventors: Ryouji Oda, Tokyo (JP); Sadaharu Hashimoto, Tokyo (JP)

(73) Assignee: Zeon Corporation, Tokyo (JP)

( * ) Notice: Subject to any disclaimer, the term of this patent is extended or adjusted under 35 U.S.C. 154(b) by 147 days.

(21) Appl. No.: 13/377,990

(22) PCT Filed: Jun. 24, 2010

(86) PCT No.: PCT/JP2010/060760
§ 371 (c)(1),
(2), (4) Date: Dec. 13, 2011

(87) PCT Pub. No.: WO2011/001896
PCT Pub. Date: Jan. 6, 2011

(65) Prior Publication Data
US 2012/0088423 A1    Apr. 12, 2012

(30) Foreign Application Priority Data
Jun. 30, 2009    (JP) ................. 2009-155986

(51) Int. Cl.
B32B 27/12    (2006.01)
C08J 5/18    (2006.01)
C08L 53/02    (2006.01)
B32B 5/02    (2006.01)

(52) U.S. Cl.
USPC ............................................. 525/89; 525/95

(58) Field of Classification Search
USPC ........................................... 525/89, 95
See application file for complete search history.

(56) References Cited

U.S. PATENT DOCUMENTS

| | | | |
|---|---|---|---|
| 4,104,327 A | 8/1978 | Inoue et al. | |
| 4,335,221 A | 6/1982 | Gerberding | |
| 4,386,125 A | 5/1983 | Shiraki et al. | |
| 4,699,938 A | 10/1987 | Minamizaki et al. | |
| 4,939,207 A | 7/1990 | Fasulo et al. | |
| 5,290,842 A | 3/1994 | Sasaki et al. | |
| 5,723,222 A | 3/1998 | Sato et al. | |
| 6,291,583 B1 | 9/2001 | Komatsuzaki et al. | |
| 6,329,459 B1 | 12/2001 | Kang et al. | |
| 6,344,518 B1 | 2/2002 | Kobayashi et al. | |
| 6,531,263 B2 | 3/2003 | Knoll | |
| 6,593,430 B1 | 7/2003 | Knoll et al. | |
| 7,318,985 B2 | 1/2008 | Tsubaki et al. | |
| 2004/0242775 A1 | 12/2004 | Tahara et al. | |
| 2005/0009990 A1 | 1/2005 | Knoll et al. | |
| 2005/0203198 A1* | 9/2005 | Branch et al. | 521/91 |
| 2005/0233249 A1 | 10/2005 | Muldermans et al. | |
| 2006/0043629 A1* | 3/2006 | Drzal et al. | 264/140 |
| 2006/0099373 A1 | 5/2006 | Dupont et al. | |
| 2006/0205874 A1 | 9/2006 | Uzee et al. | |
| 2006/0205877 A1 | 9/2006 | DuBois | |
| 2006/0235165 A1 | 10/2006 | Kawanabe et al. | |
| 2008/0318161 A1 | 12/2008 | Nakano et al. | |
| 2009/0264591 A1* | 10/2009 | Sano et al. | 525/93 |
| 2011/0046307 A1 | 2/2011 | Takeshi et al. | |
| 2011/0256195 A1* | 10/2011 | Heinemann et al. | 424/403 |
| 2011/0257337 A1 | 10/2011 | Oda et al. | |

FOREIGN PATENT DOCUMENTS

| | | |
|---|---|---|
| CN | 102264854 A | 11/2011 |
| EP | 1 775 332 A1 | 4/2007 |
| EP | 1625178 B1 | 7/2007 |
| EP | 2371900 A1 | 10/2011 |
| EP | 2402817 A1 | 1/2012 |
| EP | 2415836 A1 | 2/2012 |
| GB | 1395822 A | 5/1975 |
| JP | 51-125135 A | 11/1976 |
| JP | 56-59230 A | 5/1981 |
| JP | 57-178722 A | 11/1982 |
| JP | 59-187048 A | 10/1984 |
| JP | 61-231070 A | 10/1986 |
| JP | 63-66277 A | 3/1988 |
| JP | 63-179956 A | 7/1988 |
| JP | 64-65152 A | 3/1989 |
| JP | 64-79251 A | 3/1989 |
| JP | 2-222440 A | 9/1990 |
| JP | 5-93176 A | 4/1993 |

(Continued)

OTHER PUBLICATIONS

Extended European Search Report for European Application No. 10746236.8, dated Jun. 22, 2012.

(Continued)

*Primary Examiner* — Jeffrey Mullis
(74) *Attorney, Agent, or Firm* — Birch, Stewart, Kolasch & Birch, LLP

(57) ABSTRACT

The present invention provides a composition for a stretchable film, which achieves a high-level balance between a high elastic modulus and a small permanent elongation, which is excellent in adhesive force when laminated with a non-woven fabric or the like, and also has good formability. The present invention also provides a composition for a stretchable film comprising a block copolymer composition containing a block copolymer A represented by the following general formula (A) and a block copolymer B represented by the following general formula (B), and a polyolefin-based thermoplastic resin:

$$Ar1^a\text{-}D^a\text{-}Ar2^a \quad (A)$$

$$(Ar^b\text{-}D^b)_n\text{-}X \quad (B),$$

in these formulas, $Ar1^a$ and $Ar^b$ each represent an aromatic vinyl polymer block having a weight average molecular weight of 6,000 to 20,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a single bond or a residue of a coupling agent; and n represents an integer of 2 or greater.

6 Claims, No Drawings

(56) References Cited

FOREIGN PATENT DOCUMENTS

| | | |
|---|---|---|
| JP | 5-263056 A | 10/1993 |
| JP | 5-287084 A | 11/1993 |
| JP | 8-60121 A | 3/1996 |
| JP | 8-283685 A | 10/1996 |
| JP | 9-66554 A | 3/1997 |
| JP | 9-78048 A | 9/1997 |
| JP | 11-12430 A | 1/1999 |
| JP | 2000-155418 A | 6/2000 |
| JP | 2000-204129 A | 7/2000 |
| JP | 2001-504519 A | 4/2001 |
| JP | 2001-520244 A | 10/2001 |
| JP | 2002-60583 A | 2/2002 |
| JP | 2002-72457 A | 3/2002 |
| JP | 2002-519465 A | 7/2002 |
| JP | 2003-73434 A | 3/2003 |
| JP | 2003-261740 A | 9/2003 |
| JP | 2004-107519 A | 4/2004 |
| JP | 2004-238548 A | 8/2004 |
| JP | 2004-331707 A | 11/2004 |
| JP | 2005-510612 A | 4/2005 |
| JP | 2005-232246 A | 9/2005 |
| JP | 2006-89546 A | 4/2006 |
| JP | 2006-514338 A | 4/2006 |
| JP | 2006-241177 A | 9/2006 |
| JP | 2006-520826 A | 9/2006 |
| JP | 2006-274158 A | 10/2006 |
| JP | 2006-282683 A | 10/2006 |
| JP | 2006-528273 A | 12/2006 |
| JP | 2007-230180 A | 9/2007 |
| JP | 2008-7654 A | 1/2008 |
| JP | 2008-533230 A | 8/2008 |
| WO | WO 97/30844 A1 | 8/1997 |
| WO | WO 99/19388 A1 | 4/1999 |
| WO | WO 00/00546 A1 | 1/2000 |
| WO | WO 03/020825 A1 | 3/2003 |
| WO | WO 2004/074392 A1 | 9/2004 |
| WO | WO 2004/076556 A1 | 9/2004 |
| WO | WO 2004/104095 A1 | 12/2004 |
| WO | WO 2005/031459 A1 | 4/2005 |
| WO | WO 2006/051863 A1 | 5/2006 |
| WO | WO 2007/072613 A1 | 6/2007 |
| WO | WO 2009/123089 A1 | 10/2009 |

OTHER PUBLICATIONS

International Search Report for International Application No. PCT/JP2009/056449, dated Jun. 9, 2009.
International Search Report for International Application No. PCT/JP2009/071684, dated Feb. 2, 2010.
International Search Report for International Application No. PCT/JP2009/071692, dated Feb. 23, 2010.
International Search Report for International Application No. PCT/JP2010/052879, dated Mar. 23, 2010.
International Search Report for International Application No. PCT/JP2010/055580, dated Jun. 15, 2010.
International Search Report for International Application No. PCT/JP2010/0555581, dated Jun. 29, 2010.
US Office Action for U.S. Appl. No. 12/935,361, dated Aug. 31, 2012.
US Office Action for U.S. Appl. No. 13/141,950, dated Sep. 11, 2012.
US Office Action for U.S. Appl. No. 13/142,065, dated Sep. 7, 2012.
US Office Action for U.S. Appl. No. 13/255,354, dated Aug. 31, 2012.
Office Action for U.S. Appl. No. 13/138,493, dated Feb. 19, 2013.
Extended European Search Report for European Application No. 10794065.2, dated Jan. 17, 2013.
US Office Action for copending U.S. Appl. No. 13/141,950, dated Mar. 21, 2013.
US Office Action for copending U.S. Appl. No. 13/255,217, dated Apr. 3, 2013.
International Search Report for PCT/JP2010/060760 dated Aug. 10, 2010.
European Search Report for European Application No. EP10758654.7 dated Jun. 5, 2013.
Notice of Allowance for U.S. Appl. No. 13/142,065 dated Apr. 5, 2013.
Notice of Allowance for U.S. Appl. No. 13/255,354, dated Mar. 18, 2013.
Office Action for U.S. Appl. No. 13/141,950, dated Mar. 21, 2013.
US Office Action for U.S. Appl. No. 13/255,217 dated Nov. 12, 2013.

\* cited by examiner

COMPOSITION FOR STRETCHABLE FILM

TECHNICAL FIELD

The present invention relates to a composition for a stretchable film, and more particularly, to a composition for a stretchable film, which can be suitably used as a material for forming a stretchable film that is suitably used as a member or the like for hygiene products such as disposable diapers or sanitary products. The stretchable film has both a high elastic modulus and a small permanent elongation, which is excellent in adhesive force when laminated with a non-woven fabric or the like, and also has good formability.

BACKGROUND ART

Aromatic vinyl-conjugated diene-aromatic vinyl block copolymers such as a styrene-isoprene-styrene block copolymer (SIS) and a styrene-butadiene-styrene block copolymer (SBS) are thermoplastic elastomers having characteristic properties in various aspects, and are therefore used in a variety of applications. Among thermoplastic elastomers, since aromatic vinyl-conjugated diene-aromatic vinyl block copolymers in particular are highly elastic and flexible, use of the copolymers as a material for stretchable films used in hygiene products such as disposable diapers and sanitary products, has become one of representative applications of aromatic vinyl-conjugated diene-aromatic vinyl block copolymers.

Since hygiene products such as disposable diapers and sanitary products are required to have following capability and fittability to the movement of wearers, stretchable films are used in various parts of these products. For example, in pull-up type diapers which are a type of disposable diapers, stretchable films are used in the opening areas around the legs, the opening area around the waist, and both hip areas. Since it is necessary that hygiene products do not move out of place even if the wearers move very actively or if the hygiene products are worn for a long time period, stretchable films that are used in such applications are required to have both a high elastic modulus and a small permanent elongation. However, regarding the conventional aromatic vinyl-conjugated diene-aromatic vinyl block copolymers, it has been inappropriate to say that a good balance is achieved between these characteristics. Therefore, investigations have been extensively carried out to improve the elastic modulus or the permanent elongation of aromatic vinyl-conjugated diene-aromatic vinyl block copolymers.

For example, Patent Literature 1 discloses that when an elastomeric polymer blend composition containing: 65 to 92 parts by weight of a specific elastomer-monovinylidene aromatic-conjugated diene block copolymer having a monovinylidene aromatic content of less than 50% by weight, and 8 to 35 parts by weight of a specific thermoplastic monovinylidene aromatic-conjugated diene block copolymer having a monovinylidene aromatic content of 50% by weight or more, is used, elastomer articles exhibiting excellent elasticity and stress relaxation characteristics are obtained.

Furthermore, Patent Literature 2 discloses that when a composition obtainable by incorporating a specific polyisoprene or the like into a specific aromatic vinyl-conjugated diene block copolymer is extrusion molded, a stretchable film which is anisotropic and excellent in flexibility, and which is suitably used as a member of hygiene products such as disposable diapers and sanitary products, is obtained.

However, even the technologies described in these Literatures are still unsatisfactory from the viewpoint of achieving a high-level balance between a high elastic modulus and a small permanent elongation, and further improvements have been desired.

Furthermore, Patent Literature 3 describes that when a blend of an aromatic vinyl-conjugated diene block copolymer with polyolefin is produced into a film by extrusion molding, the film exhibits an elastic property that is different in the longitudinal direction from that of the horizontal direction, and thus, is suitably used as a film dedicated for a specific use where such anisotropic is desired. However, even the technology described in Patent Literature 3 is still unsatisfactory from the viewpoint of achieving a high-level balance between a high elastic modulus and a small permanent elongation.

Incidentally, when a stretchable film is used in hygiene products such as disposable diapers or sanitary products, great importance is attached to texture or flexibility. Therefore, for example, a stretchable laminate which is formed by laminating a non-woven fabric on at least one surface of a stretchable film, such as disclosed in Patent Literature 4, is used as a stretchable member in many cases. In such a laminate, an adhesive force that is so strong that the non-woven fabric and the stretchable film would not undergo peeling during the production process or during the use of the hygiene product, is required. It is also desired that such a laminate be produced with satisfactory productivity.

CITATION LIST

Patent Literature

Patent Literature 1: Japanese Translation of PCT Application No. 2006-528273
Patent Literature 2: Japanese Patent Application Laid-Open (JP-A) No. 2008-007654
Patent Literature 3: Japanese Translation of PCT Application No. 2001-520244
Patent Literature 4: JP-A No. 2007-230180

SUMMARY OF INVENTION

Technical Problem

An object of the present invention is to provide a composition for a stretchable film, which is capable of achieving a high-level balance between a high elastic modulus and a small permanent elongation, which is excellent in adhesive force when laminated with a non-woven fabric or the like, and furthermore, also has good formability.

Solution to Problem

The inventors of the present invention conducted a thorough investigation in order to achieve the object described above. As a result, the inventors found that a composition obtainable by incorporating a polyolefin-based thermoplastic resin to a block copolymer composition containing: an asymmetric aromatic vinyl-conjugated diene-aromatic vinyl block copolymer in which two aromatic vinyl polymer blocks have specific weight average molecular weight that are different from each other, and an aromatic vinyl-conjugated diene-aromatic vinyl block copolymer having a particular constitution different from that of the foregoing block copolymer, is capable of achieving a high-level balance between a high elastic modulus and a small permanent elongation, and furthermore, can be produced into a film with satisfactory formability. The inventors also found that when the composition is laminated with a non-woven fabric or the like and is thereby produced into a stretchable laminate, the composition does not easily peel off from the non-woven fabric. Thus, the present invention was finally completed based on these findings.

Thus, according to the present invention, there is provided a composition for a stretchable film, comprising a block copolymer composition containing a block copolymer A represented by the following general formula (A) and a block copolymer B represented by the following general formula (B), and a polyolefin-based thermoplastic resin.

$$\text{Ar1}^a\text{-}D^a\text{-}\text{Ar2}^a \tag{A}$$

$$(\text{Ar}^b\text{-}D^b)_n\text{-}X \tag{B}$$

In the general formulas (A) and (B), $\text{Ar1}^a$ and $\text{Ar}^b$ each represent an aromatic vinyl polymer block having a weight average molecular weight of 6,000 to 20,000; $\text{Ar2}^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a single bond or a residue of a coupling agent; and n represents an integer of 2 or greater.

In the composition for a stretchable film, a weight ratio (A/B) of the block copolymer A and the block copolymer B in the block copolymer composition is preferably 10/90 to 90/10.

In the composition for a stretchable film, a content of an aromatic vinyl monomer unit relative to all repeating units of polymer components in the block copolymer composition is preferably 20% to 70% by weight.

In the composition for a stretchable film, the polyolefin-based thermoplastic resin is preferably contained in an amount of 3 to 50 parts by weight relative to 100 parts by weight of the block copolymer composition.

In the composition for a stretchable film, the polyolefin-based thermoplastic resin is preferably a polyethylene, or a copolymer of ethylene and another α-olefin.

Furthermore, according to the present invention, there is provided a stretchable film formed by using the composition for a stretchable film.

Moreover, according to the present invention, there is provided a stretchable laminate obtained by laminating a non-woven fabric on one surface or on both surfaces of the stretchable film.

Moreover, according to the present invention, there is provided a method for producing a stretchable laminate comprising continuously carrying out steps of: extrusion-molding the composition for a stretchable film into a film form, and laminating a non-woven fabric on one surface or on both surfaces of the composition for a stretchable film in the extruded film form.

Advantageous Effects of Invention

According to the present invention, there is an obtained composition for a stretchable film, which achieves a high-level balance between a high elastic modulus and a small permanent elongation, which is excellent in adhesive force when laminated with a non-woven fabric or the like, and furthermore, also has good formability.

DESCRIPTION OF EMBODIMENTS

The composition for a stretchable film of the present invention comprises a block copolymer composition and a polyolefin-based thermoplastic resin. The block copolymer composition that is used to obtain the composition for a stretchable film of the present invention contains at least two kinds of block copolymers. A block copolymer A, which is one of the two kinds of block copolymers constituting the block copolymer composition used in the present invention, is a linear aromatic-vinyl-conjugated diene-aromatic vinyl block copolymer represented by the following general formula (A), which has two aromatic vinyl polymer blocks having different weight average molecular weights.

$$\text{Ar1}^a\text{-}D^a\text{-}\text{Ar2}^a \tag{A}$$

In the general formula (A), $\text{Ar1}^a$ represents an aromatic vinyl polymer block having a weight average molecular weight of 6,000 to 20,000; $\text{Ar2}^a$ represents an aromatic vinyl polymer block having a weight average molecular weight of 40,000 to 400,000; and $D^a$ represents a conjugated diene polymer block having a vinyl bond content of 1 to 20 mol %.

Block copolymer B, which is the other one of the block copolymers constituting the block copolymer composition used in the present invention, is an aromatic vinyl-conjugated diene-aromatic vinyl block copolymer represented by the following general formula (B).

$$(\text{Ar}^b\text{-}D^b)_n\text{-}X \tag{B}$$

In the general formula (B), $\text{Ar}^b$ represents an aromatic vinyl polymer block having a weight average molecular weight of 6,000 to 20,000; $D^b$ represents a conjugated diene polymer block having a vinyl bond content of 1 to 20 mol %; X represents a single bond or a residue of a coupling agent; and n represents an integer of 2 or greater.

The aromatic vinyl polymer blocks ($\text{Ar1}^a$, $\text{Ar2}^a$ and $\text{Ar}^b$) of the block copolymer A and the block copolymer B are polymer blocks each constituted of an aromatic vinyl monomer unit. There are no particular limitations on the aromatic vinyl monomer that may be used to constitute aromatic vinyl monomer units of the aromatic vinyl polymer blocks as long as the aromatic vinyl monomer is an aromatic vinyl compound, but examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinyl naphthalene. Among these, it is preferable to use styrene. These aromatic vinyl monomers can be used singly or in combination of two or more kinds, in the respective aromatic vinyl polymer blocks. Furthermore, for the respective aromatic vinyl polymer blocks, an identical aromatic vinyl monomer may be used throughout, or different aromatic vinyl monomer may be used.

The aromatic vinyl polymer blocks ($\text{Ar1}^a$, $\text{Ar2}^a$ and $\text{Ar}^b$) of the block copolymer A and the block copolymer B may respectively include a monomer unit other than the aromatic vinyl monomer unit. Examples of monomers that constitute the monomer unit other than the aromatic vinyl monomer unit, which can be included in the aromatic vinyl polymer blocks, include a conjugated diene monomer such as 1,3-butadiene and isoprene (2-methyl-1,3-butadiene), an α,β-unsaturated nitrile monomer, an unsaturated carboxylic acid or acid anhydride monomer, an unsaturated carboxylic acid ester monomer, and a non-conjugated diene monomer. The content of the monomer unit other than the aromatic vinyl monomer unit in the respective aromatic vinyl polymer blocks is preferably 20% by weight or less, and more preferably 10% by weight or less, and it is particularly preferable that the content be substantially 0% by weight.

The conjugated diene polymer block ($D^a$ and $D^b$) of the block copolymer A and the block copolymer B are polymer blocks each constituted of a conjugated diene monomer unit. There are no particular limitations on the conjugated diene monomer that may be used to constitute the conjugated diene monomer unit of the conjugated diene polymer blocks as long as the conjugated diene monomer is a conjugated diene compound, but examples include 1,3-butadiene, isoprene, 2,3-dimethyl-1,3-butadiene, 2-chloro-1,3-butadiene, 1,3-pentadiene and 1,3-hexadiene. Among these, it is recommended to use 1,3-butadiene and/or isoprene, and it is particularly preferable to use isoprene. When the conjugated diene polymer blocks are constituted of an isoprene unit, a composition for a stretchable film having excellent flexibility and a lower permanent elongation can be obtained. These conjugated diene monomers can be used singly or in combination of two or more kinds, in the respective conjugated diene polymer blocks. Furthermore, for the respective conjugated diene polymer blocks, an identical conjugated diene monomer may be used throughout, or a different conjugated diene monomer may be used. Furthermore, a portion of the unsaturated bonds in the respective conjugated diene polymer blocks may be subjected to hydrogenation reaction.

The conjugated diene polymer blocks ($D^a$ and $D^b$) of the block copolymer A and the block copolymer B may respectively include a monomer unit other than the conjugated diene monomer unit. Examples of monomers that constitute the monomer unit other than the conjugated diene monomer unit, which can be included in conjugated diene polymer block, include an aromatic vinyl monomer such as styrene and α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the respective conjugated diene polymer block is preferably 20% by weight or less, and more preferably 10% by weight or less, and it is particularly preferable that the content be substantially 0% by weight.

The block copolymer A that constitutes the block copolymer composition used in the present invention is a linear asymmetric aromatic vinyl-conjugated diene-aromatic vinyl block copolymer composed of an aromatic vinyl block ($Ar1^a$) having a relatively small weight average molecular weight, a conjugated diene polymer block ($D^a$) having a specific vinyl bond content, and an aromatic vinyl polymer block ($Ar2^a$) having a relatively large weight average molecular weight, linked in this order in a linear form, as represented by the general formula (A). The weight average molecular weight (Mw ($Ar1^a$)) of the aromatic vinyl polymer block ($Ar1^a$) having a relatively small weight average molecular weight is 6,000 to 20,000, preferably 7,000 to 18,000, and more preferably 8,000 to 15,000. If Mw ($Ar1^a$) does not fall in this range, there is a risk that the resulting composition for a stretchable film may have a permanent elongation which is too high. Furthermore, the weight average molecular weight (Mw ($Ar2^a$)) of the aromatic vinyl polymer block ($Ar2^a$) having a relatively large weight average molecular weight is 40,000 to 400,000, preferably 42,000 to 370,000, and more preferably 45,000 to 350,000. If Mw ($Ar2^a$) is too small, there is a risk that the resulting composition for a stretchable film may have a permanent elongation which is too high, while a block copolymer A having a Mw ($Ar2^a$) which is too high may be difficult to produce.

In the present invention, the weight average molecular weight of a polymer or polymer block is a value determined by a measurement by high performance liquid chromatography, relative to polystyrene standards.

In the block copolymer A, there are no particular limitations on the ratio (Mw ($Ar2^a$)/Mw ($Ar1^a$)) of the weight average molecular weight (Mw ($Ar2^a$)) of the aromatic vinyl polymer block ($Ar2^a$) having a relatively large weight average molecular weight and the weight average molecular weight (Mw ($Ar1^a$)) of the aromatic vinyl polymer block ($Ar1^a$) having a relatively small weight average molecular weight, but the ratio is usually 2 to 67, preferably 4 to 40, and more preferably 4.5 to 35. When the block copolymer A is constructed to have such a constitution, a composition for a stretchable film which has a lower permanent elongation and a higher elastic modulus and is highly elastic, can be obtained.

The vinyl bond content of the conjugated diene polymer blocks ($D^a$) of the block copolymer A (the content of 1,2-vinyl bond and 3,4-vinyl bond in all the conjugated diene monomer units) is 1 to 20 mol %, preferably 2 to 15 mol %, and more preferably 3 to 10 mol %. If this vinyl bond content is too large, there is a risk that the resulting composition for a stretchable film may have an increased permanent elongation.

The weight average molecular weight of the conjugated diene polymer blocks ($D^a$) of the block copolymer A (Mw ($D^a$)) is not particularly limited, but is usually 20,000 to 200,000, preferably 35,000 to 150,000, and more preferably 45,000 to 100,000.

There are no particular limitations on the content of the aromatic vinyl monomer units relative to all the monomer units of the block copolymer A, but the content is usually 40 to 90% by weight, preferably 45 to 87% by weight, and more preferably 50 to 85% by weight. Furthermore, there are no particular limitations on the overall weight average molecular weight of the block copolymer A, but the weight average molecular weight is usually 50,000 to 500,000, preferably 80,000 to 470,000, and more preferably 90,000 to 450,000.

The block copolymer B that constitutes the block copolymer composition used in the present invention is a block copolymer in which two or more of diblock forms ($Ar^b$-$D^b$), each of which is composed of an aromatic vinyl polymer block ($Ar^b$) having a specific weight average molecular weight linked to a conjugated diene polymer block ($D^b$) having a specific vinyl bond content, are linked directly by a single bond, or through a coupling agent residue (X) such that the aromatic vinyl polymer block ($Ar^b$) side comes as the terminal, as represented by the general formula (B). Examples of the coupling agent that constitute the residue of a coupling agent include those compounds that will be described later. The number of the diblock forms ($Ar^b$-$D^b$) that are linked together (that is, n in the general formula (B)) is not particularly limited as long as the number is 2 or greater, and a block copolymer B in which different numbers of the diblock forms are linked may be present in mixture. There are no particular limitations on the number n in the general formula (B) as long as the number is an integer of 2 or greater, but the number is usually an integer from 2 to 8, and preferably an integer from 2 to 4.

The weight average molecular weights (Mw ($Ar^b$)) of the two or more aromatic vinyl polymer blocks ($Ar^b$) that are present in one molecule of the block copolymer Bare each 6,000 to 20,000, preferably 7,000 to 18,000, and more preferably 8,000 to 15,000. If Mw ($Ar^b$) does not fall in this range, there is a risk that the resulting composition for a stretchable film may have a permanent elongation which is too high. If the weight average molecular weights (Mw ($Ar^b$)) of the two or more aromatic vinyl polymer blocks that are present in one molecule of the block copolymer B are in the range described above, the weight average molecular weights may be identical to or different from one another; however, it is preferable that the weight average molecular weights be substantially identical. Furthermore, it is more preferable that the weight average molecular weights (Mw (Ar$^b$)) of these aromatic vinyl polymer blocks be substantially identical with the weight average molecular weight (Mw (Ar1$^a$)) of the aromatic vinyl polymer block (Ar1$^a$) having a relatively small weight average molecular weight in the block copolymer A.

The vinyl bond content of the conjugated diene polymer block (D$^b$) of the block copolymer B is 1 mol % to 20 mol %, preferably 2 mol % to 15 mol %, and more preferably 3 mol % to 10 mol %. If this vinyl bond content is too large, there is a risk that the resulting composition for a stretchable film may have an increased permanent elongation. Furthermore, it is preferable that the vinyl bond content of the conjugated diene polymer block (D$^b$) of the block copolymer B be substantially identical with the vinyl bond content of the conjugated diene polymer block (D$^a$) of the block copolymer A.

There are no particular limitations on the weight average molecular weight (Mw (D$^b$)) of the conjugated diene polymer block (D$^b$) of the block copolymer B, but the weight average molecular weight is usually 20,000 to 200,000, preferably 35,000 to 150,000, and more preferably 45,000 to 100,000. When the weight average molecular weight (Mw (D$^b$)) of the conjugated diene polymer block (D$^b$) of the block copolymer B is in this range, a composition for a stretchable film which has a lower permanent elongation and a higher elastic modulus and which has high elasticity may be obtained. Furthermore, it is preferable that the weight average molecular weight (Mw (D$^b$)) of the conjugated diene polymer block (D$^b$) of the block copolymer B be substantially identical with the weight average molecular weight (Mw (D$^a$)) of the conjugated diene polymer block (D$^a$) of the block copolymer A. When these weight average molecular weights are substantially identical, the resulting composition for a stretchable film acquires a higher elastic modulus and becomes highly elastic. Furthermore, when an aromatic vinyl-conjugated diene-aromatic vinyl block copolymer produced without using a coupling agent is used as a block copolymer B, the conjugated diene polymer blocks included in the block copolymer have all the monomer units directly linked together, and in reality, it cannot be said that this block copolymer is composed of two conjugated diene polymer blocks (D$^b$). However, in the present invention, even in the case of such conjugated diene polymer blocks, the block copolymer is conceptually regarded as a product in which two conjugated diene polymer blocks (D$^b$) having substantially identical weight average molecular weights are linked by a single bond. Therefore, for example, in the case of a block copolymer B which is an aromatic vinyl-conjugated diene-aromatic vinyl block copolymer produced without using a coupling agent, when the conjugated diene polymer block has an overall weight average molecular weight of 100,000, the block copolymer is considered to have a Mw (D$^b$) of 50,000.

There are no particular limitations on the content of the aromatic vinyl monomer unit relative to the all the monomer units of the block copolymer B, but the content is usually 10% to 35% by weight, preferably 12% to 32% by weight, and more preferably 15% to 30% by weight. Furthermore, there are no particular limitations on the overall weight average molecular weight of the block copolymer B, but the overall weight average molecular weight is usually 60,000 to 800,000, preferably 80,000 to 600,000, and more preferably 100,000 to 400,000.

There are no particular limitations on the molecular weight distribution, which is expressed as the ratio (Mw/Mn) of the weight average molecular weight (Mw) and the number average molecular weight (Mn), of the block copolymer A and the block copolymer B constituting the block copolymer composition used in the present invention, and of each of the polymer blocks constituting these block copolymers, but the molecular weight distribution is usually 1.1 or less, and preferably 1.05 or less.

There are no particular limitations on the weight ratio (A/B) of the block copolymer A and the block copolymer B in the block copolymer composition used in the present invention, but the weight ratio is preferably 10/90 to 90/10, more preferably 36/64 to 80/20, even more preferably 38/62 to 80/20, and most preferably 40/60 to 75/25. When the respective block copolymers are contained at these ratios, the resulting composition for a stretchable film is particularly excellent in the balance between a high elastic modulus and a small permanent elongation. On the other hand, if this ratio is too small, there is a risk that the composition for a stretchable film may have an unsatisfactory elastic modulus, and if this ratio is too large, there is a risk that the composition for a stretchable film may have an excessively large permanent elongation.

It is desirable that the block copolymer composition used in the present invention contains only the block copolymer A and the block copolymer B as polymer components, but it is also acceptable that the block copolymer composition contains a polymer component other than the block copolymer A and the block copolymer B. Examples of the polymer component other than the block copolymer A and the block copolymer B, which can be contained in the block copolymer composition used in the present invention, include an aromatic vinyl-conjugated diene-aromatic vinyl block copolymer of the block copolymer A and the block copolymer B, an aromatic vinyl-conjugated diene block copolymer; an aromatic vinyl homopolymer; a conjugated diene homopolymer; an aromatic vinyl-conjugated diene random copolymer, and branched polymers thereof; as well as thermoplastic elastomers such as a polyurethane-based thermoplastic elastomer, a polyamide-based thermoplastic elastomer, and a polyester-based thermoplastic elastomer; and thermoplastic resins such as polyvinyl chloride, an acrylonitrile-styrene copolymer, an acrylonitrile-butadiene-styrene copolymer, and polyphenylene ether. However, the polyolefin-based thermoplastic resin that will be discussed later is to be distinguished from these polymer components that constitute the block copolymer composition. In the block copolymer composition used in the present invention, the content of the polymer component other than the block copolymer A and the block copolymer B is preferably 20% by weight or less, and more preferably 10% by weight or less, relative to the all the polymer components.

In the block copolymer composition used in the present invention, the content of the aromatic vinyl monomer unit (in the following descriptions, may be referred to as a total aromatic vinyl monomer unit content) relative to all the repeating units of the entire polymer components contained in the composition, is not particularly limited to, but is preferably 20% to 70% by weight, more preferably 30% to 60% by weight, and even more preferably 40% to 50% by weight. When the total aromatic vinyl monomer unit content is in this range, the composition for a stretchable film achieves a particularly excellent balance between a high elastic modulus and a small permanent elongation. This total aromatic vinyl monomer unit content can be easily regulated by taking the contents of the block copolymer A, the block copolymer B and the polymer component other than these, which constitute the block copolymer composition, and the contents of the respective aromatic vinyl monomer units into consideration, and regulating their amounts of incorporation. Furthermore, in a case where all the polymer components that constitute the block copolymer composition are composed of aromatic vinyl monomer units and conjugated diene monomer units only, when the polymer components of the block copolymer composition are subjected to ozone decomposition and then to a reduction with lithium aluminum hydride according to the method described in Rubber Chem. Technol., 45, 1295 (1972), the conjugated diene monomer unit portion is decomposed, and only the aromatic vinyl monomer unit portion can be extracted. Therefore, the total aromatic vinyl monomer unit content can be easily measured.

There are no particular limitations on the overall weight average molecular weight of the polymer components constituting the block copolymer composition used in the present invention, but the overall weight average molecular weight is usually 50,000 to 500,000, preferably 60,000 to 450,000, and more preferably 70,000 to 400,000. Furthermore, there are no particular limitations on the molecular weight distribution, which is expressed as the ratio (Mw/Mn) of the weight average molecular weight (Mw) and the number average molecular weight (Mn) of the entire polymer components constituting the block copolymer composition used in the present invention, but the molecular weight distribution is usually 1.01 to 10, preferably 1.03 to 5, and more preferably 1.05 to 3.

There are no particular limitations on the method of obtaining the block copolymer composition used in the present invention. For example, the block copolymer composition can be produced by separately producing a block copolymer A and a block copolymer B according to a conventional method for producing a block copolymer, incorporating other polymer components and the like as needed, and then mixing the components according to a conventional method such as kneading or solution mixing. However, from the viewpoint of obtaining the block copolymer composition having a particularly preferred constitution with higher productivity, the method described below is suitable.

That is, the block copolymer composition used in the present invention is preferably produced by using a production method which includes the following steps (1) to (5).

(1): A step of polymerizing an aromatic vinyl monomer using a polymerization initiator in a solvent.

(2): A step of adding a conjugated diene monomer to the solution containing the aromatic vinyl polymer having an active terminal, which is obtained in the step (1).

(3): A step of adding a coupling agent to the solution containing the aromatic vinyl-conjugated diene block copolymer having an active terminal, which is obtained in the step (2), in an amount such that the amount of the functional groups of the coupling agent relative to the active terminal is less than 1 molar equivalent, and thereby forming a block copolymer B.

(4): A step of adding an aromatic vinyl monomer to the solution that is obtained in the step (3), and thereby forming a block copolymer A.

(5): A step of collecting the block copolymer composition from the solution that is obtained in the step (4).

In the production method of the block copolymer composition described above, first, an aromatic vinyl monomer is polymerized by using a polymerization initiator in a solvent. Examples of the polymerization initiator that can be used include an organic alkali metal compound, an organic alkaline earth metal compound, and an organic lanthanoid series rare earth metal compound, which are generally known to have an anionic polymerization activity toward aromatic vinyl monomers and conjugated diene monomers. As the organic alkali metal compound, an organolithium compound having one or more lithium atoms in the molecule in particular is considered to be suitable, and specific examples thereof include organic monolithium compounds such as ethyllithium, n-propyllithium, isopropyllithium, n-butyllithium, sec-butyllithium, t-butyllithium, hexyllithium, phenyllithium, stilbene lithium, dialkylaminolithium, diphenylaminolithium and ditrimethylsilylaminolithium; organic dilithium compounds such as methylenedilithium, tetramethylenedilithium, hexamethylenedilithium, isoprenyldilithium and 1,4-dilithio-ethylcyclohexane; and organic trilithium compounds such as 1,3,5-trilithiobenzene. Among these, organic monolithium compounds are suitable to be used in particular.

Examples of the organic alkaline earth metal compound that is used as a polymerization initiator include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators include compounds which form a homogeneous system in an organic solvent and have living polymerizability, such as a composite catalyst formed from a lanthanoid series rare earth metal compound containing neodymium, samarium, gadolinium or the like/alkylaluminum/alkylaluminum halide/alkylaluminum hydride, and a metallocene type catalyst containing titanium, vanadium, samarium, gadolinium or the like. These polymerization initiators may be used singly, or in mixtures of two or more kinds.

The amount of use of the polymerization initiator may be determined in accordance with the intended molecular weight of each block copolymer and is not particularly limited. However, the amount of use is usually 0.01 to 20 millimoles, preferably 0.05 to 15 millimoles, and more preferably 0.1 to 10 millimoles, per 100 g of all kinds of monomers used.

There are no particular limitations on the solvent used in the polymerization as long as the solvent is inert to the polymerization initiator, and for example, an aliphatic hydrocarbon solvent, a cyclic hydrocarbon solvent, or a solvent mixture thereof is used. Examples of the aliphatic hydrocarbon solvent include aliphatic alkanes and alkenes having 4 to 6 carbon atoms, such as n-butane, isobutane, 1-butene, isobutylene, trans-2-butene, cis-2-butene, 1-pentene, trans-2-pentene, cis-2-pentene, n-pentane, isopentane, neopentane, and n-hexane. Specific examples of the cyclic hydrocarbon solvent include aromatic compounds such as benzene, toluene and xylene; and alicyclic hydrocarbon compounds such as cyclopentane and cyclohexane. These solvents may be used singly, or as mixtures of two or more kinds.

There are no particular limitations on the amount of the solvent used in the polymerization, but the amount is set such that the total concentration of the block copolymers in the solution after the polymerization reaction is usually 5% to 60% by weight, preferably 10% to 55% by weight, and more preferably 20% to 50% by weight.

Upon the preparation of the block copolymer composition, a Lewis base compound may be added to the reactor used in the polymerization, in order to control the structures of the various polymer blocks of the respective block copolymers. Examples of this Lewis base compound include: ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; and phosphines such as triphenylphosphine. These Lewis base compounds are used singly or in combination of two or more kinds, and are appropriately selected to the extent of not impairing the purposes of the present invention.

Furthermore, the timing for adding the Lewis base compound during the polymerization reaction is not particularly limited and may be appropriately determined in accordance with the structures of the respective intended block copolymers. For example, the Lewis base compound may be added in advance before initiation of the polymerization, or may be added after the completion of the polymerization of a portion of the polymer blocks. It is also acceptable to add the Lewis base compound in advance before initiation of the polymerization and then to further add the Lewis base compound after the completion of the polymerization of a portion of the polymer blocks.

The polymerization reaction temperature is usually 10° C. to 150° C., preferably 30° C. to 130° C., and more preferably 40° C. to 90° C. The time required for the polymerization may vary with the conditions, but the time is usually within 48 hours, and preferably within 0.5 to 10 hours. The polymerization pressure may be set in a pressure range sufficient to maintain the monomers and the solvent in the liquid state in the polymerization temperature range, and there are no particular limitations on the pressure.

When an aromatic vinyl monomer is polymerized under the conditions such as described above using a polymerization initiator in a solvent, a solution containing an aromatic vinyl polymer having an active terminal can be obtained. This aromatic vinyl polymer having an active terminal will constitute the aromatic vinyl polymer block ($Ar1^a$) having a relatively small weight average molecular weight of the block copolymer A and the aromatic vinyl polymer block ($Ar^b$) of the block copolymer B, which are the constituents of the block copolymer composition. Therefore, the amount of the aromatic vinyl monomer used at this time is determined in accordance with the intended weight average molecular weight of these polymer blocks.

The subsequent step is a step of adding a conjugated diene monomer to the solution containing the aromatic vinyl polymer having an active terminal obtained as described above. The addition of this conjugated diene monomer leads to the formation of a conjugated diene polymer chain from the active terminal, and thus a solution containing an aromatic vinyl-conjugated diene block copolymer (diblock form) having an active terminal is obtained. The amount of the conjugated diene monomer used at this time is determined such that the conjugated diene polymer chain thus obtained has an intended weight average molecular weight of the conjugated diene polymer block ($D^b$) of the block copolymer B.

In the subsequent step, a coupling agent is added to the solution containing an aromatic vinyl-conjugated diene block copolymer (diblock form) having an active terminal obtained as described above, in an amount such that the amount of the functional groups relative to the active terminal is less than 1 molar equivalent.

There are no particular limitations on the coupling agent to be added, and any bifunctional or higher-functional coupling agent can be used. Examples of a bifunctional coupling agent include: bifunctional halogenated silanes such as dichlorosilane, monomethyldichlorosilane and dimethyldichlorosilane; bifunctional alkoxysilanes such as diphenyldimethoxysilane and diphenyldiethoxysilane; bifunctional halogenated alkanes such as dichloroethane, dibromoethane, methylene chloride and dibromomethane; bifunctional halogenated tin compounds such as dichlorotin, monomethyldichlorotin, dimethyldichlorotin, monoethyldichlorotin, diethyldichlorotin, monobutyldichlorotin and dibutyldichlorotin; dibromobenzene, benzoic acid, CO and 2-chloropropene. Examples of a trifunctional coupling agent include: trifunctional halogenated alkanes such as trichloroethane and trichloropropane; trifunctional halogenated silanes such as methyltrichlorosilane and ethyltrichlorosilane; and trifunctional alkoxysilanes such as methyltrimethoxysilane, phenyltrimethoxysilane and phenyltriethoxysilane. Examples of a tetrafunctional coupling agent include: tetrafunctional halogenated alkanes such as carbon tetrachloride, carbon tetrabromide and tetrachloroethane; tetrafunctional halogenated silanes such as tetrachlorosilane and tetrabromosilane; tetrafunctional alkoxysilanes such as tetramethoxysilane and tetraethoxysilane; and tetrafunctional halogenated tin compounds such as tetrachlorotin and tetrabromotin. Examples of a penta- or higher-functional coupling agent include 1,1,1,2,2-pentachloroethane, perchloroethane, pentachlorobenzene, perchlorobenzene, octabromodiphenyl ether and decabromodiphenyl ether. These coupling agents may be used singly, or two or more kinds can be used in combination.

The amount of the coupling agent to be added is determined in accordance with the ratio of the block copolymer A and the block copolymer B that constitute the block copolymer composition, and there are no particular limitations as long as the amount is such that the amount of the functional groups of the coupling agent relative to the active terminal of the polymer is less than 1 molar equivalent. However, the amount of the coupling agent is usually such that the amount of the functional groups of the coupling agent relative to the active terminal of the polymer is in the range of 0.10 to 0.90 molar equivalents, and preferably in the range of 0.15 to 0.70 molar equivalents.

As described above, when a coupling agent is added to a solution containing an aromatic vinyl-conjugated diene block copolymer (diblock form) having an active terminal, in an amount such that the amount of the functional groups relative to the active terminal is less than 1 molar equivalent, for a portion of the aromatic vinyl-conjugated diene block copolymer (diblock form) having an active terminal, one conjugated diene polymer block is bonded to another conjugated diene polymer block via the residue of the coupling agent. As a result, the block copolymer B of the block copolymer composition is formed. The remaining portion of the aromatic vinyl-conjugated diene block copolymer (diblock form) having an active terminal remains unreacted in the solution.

In the subsequent step, an aromatic vinyl monomer is added to the solution obtainable as described above. When an aromatic vinyl monomer is added to the solution, an aromatic vinyl polymer chain is formed from the terminal of the aromatic vinyl-conjugated diene block copolymer (diblock form) having an active terminal, which has remained without reacting with the coupling agent. This aromatic vinyl polymer chain constitutes the aromatic vinyl polymer block ($Ar2^a$) having a relatively large weight average molecular weight of the block copolymer A, which constitutes the block copolymer composition. Therefore, the amount of the aromatic vinyl monomer used at this time is determined in accordance with the intended weight average molecular weight of the aromatic vinyl polymer block ($Ar2^a$). Through this process of adding an aromatic vinyl monomer, an asymmetric aromatic vinyl-conjugated diene-aromatic vinyl block copolymer which constitutes the block copolymer A is formed, and as a result, a solution containing the block copolymer A and the block copolymer B is obtained. Furthermore, prior to this process of adding the aromatic vinyl monomer, a conjugated diene monomer may be added to the solution containing an aromatic vinyl-conjugated diene block copolymer (diblock form) having an active terminal which has not reacted with the coupling agent. When a conjugated diene monomer is added as such, the weight average molecular weight of the conjugated diene polymer block ($D^a$) of the block copolymer A can be made larger as compared with the case where the conjugated diene monomer is not added. Furthermore, a polymerization terminator (water, methanol or the like) may be added to the solution containing the aromatic vinyl-conjugated diene block copolymer having an active terminal which has not reacted with the coupling agent, in an amount smaller than the equivalent of the active terminal. When a polymerization terminator is added as such, the active terminal of the aromatic vinyl-conjugated diene block copolymer (diblock form) is deactivated, and thereby, the aromatic vinyl-conjugated diene block copolymer (diblock form) thus obtainable is included in the block copolymer composition.

In the subsequent step, the intended block copolymer composition is collected from the solution containing the block copolymer A and the block copolymer B, which is obtainable as described above. The method of collection may be carried out according to conventional methods, and is not particularly limited. For example, a polymerization terminator such as water, methanol, ethanol, propanol, hydrochloric acid or citric acid is added as needed, after completion of the reaction, and furthermore, if necessary, additives such as an antioxidant are added. Then, the block copolymer composition can be collected by applying a known method such as a direct drying method or a steam stripping method to the solution. In the case where the block copolymer composition is collected in the form of slurry by applying steam stripping or the like, the slurry is dehydrated using any dehydrator such as an extruder type squeezer to produce crumb having a water content that is equal to or less than a predetermined value. The crumb may be further dried using any dryer such as a band dryer or an expansion-extrusion dryer. The block copolymer composition obtainable as described above may be processed into a pellet form or the like according to a conventional method and then supplied for use.

When the block copolymer composition is prepared as described above, since the block copolymer A and the block copolymer B can be continuously obtained in a same reaction vessel, the target block copolymer composition can be obtained with superior productivity as compared with the case of individually producing the respective block copolymers and mixing them. Furthermore, since the various polymer blocks of the respective block copolymers in the resulting block copolymer composition have weight average molecular weights that are balanced in a particularly desirable manner as a block copolymer composition for constituting the composition for a stretchable film of the present invention, a composition for a stretchable film in which a high elastic modulus and a small permanent elongation are very well balanced is obtained.

The composition for a stretchable film of the present invention contains a polyolefin-based thermoplastic resin in addition to the block copolymer composition such as described above, and thereby the composition can be formed into a stretchable film with good formability, and also, the processes of film production and lamination with a non-woven fabric or the like can be simultaneously carried out. Furthermore, when the composition is used to produce a stretchable laminate by laminating the stretchable film obtained by extrusion molding with a non-woven fabric or the like, the stretchable film is not easily peeled off from the non-woven fabric or the like. The polyolefin-based thermoplastic resin to be used in the present invention is not particularly limited as long as it is a thermoplastic resin having repeating units mainly composed of olefins, and may be any one of a homopolymer of $\alpha$-olefin, a copolymer of two or more kinds of $\alpha$-olefins, and a copolymer of $\alpha$-olefin and a monomer other than $\alpha$-olefin, and these (co)polymers may be those modified.

Specific examples of the polyolefin-based thermoplastic resin include: homopolymers or copolymers of $\alpha$-olefins such as ethylene and propylene, for example, homopolymers of $\alpha$-olefin such as polyethylene, polypropylene, metallocene polypropylene, polymethylpentene and polybutene, e.g., linear low density polyethylene (LLDPE), low density polyethylene (LDPE), middle density polyethylene (MDPE), high density polyethylene (HDPE) and metallocene polyethylene; copolymers of ethylene and another $\alpha$-olefin, for example, an ethylene-propylene random copolymer, an ethylene-propylene block copolymer, an ethylene-butene-1 copolymer, an ethylene-propylene-butene-1 copolymer and an ethylene-cyclic olefin copolymer; copolymers of $\alpha$-olefin and carboxylic acid unsaturated alcohol mainly composed of $\alpha$-olefin and, a saponified product thereof, for example, an ethylene-vinyl acetate copolymer, and an ethylene-vinyl alcohol copolymer; copolymers of $\alpha$-olefin and $\alpha,\beta$-unsaturated carboxylic acid ester or $\alpha,\beta$-unsaturated carboxylic acid, and the like mainly composed of $\alpha$-olefin, for example, an ethylene-$\alpha,\beta$-unsaturated carboxylic acid ester copolymer (an ethylene-ethyl acrylate copolymer, an ethylene-methyl methacrylate copolymer or the like), an ethylene-$\alpha,\beta$-unsaturated carboxylic acid copolymer (an ethylene-acrylic acid copolymer, an ethylene-methacrylate copolymer, and the like); an acid-modified olefin resin obtained by modifying an $\alpha$-olefin (co)polymer such as polyethylene or polypropylene with unsaturated carboxylic acid such as acrylic acid, methacrylic acid, maleic acid, anhydrous maleic acid, fumaric acid, itaconic acid and/or an anhydride thereof; an ionomer resin obtained by acting Na ion or Zn ion or the like on a copolymer of ethylene and methacrylate or the like; and a mixture thereof. Among these, a polyethylene, or a copolymer of ethylene and another $\alpha$-olefin is preferred, and a polyethylene produced using a metallocene catalyst, or a copolymer of ethylene and another $\alpha$-olefin produced using a metallocene catalyst is particularly preferred.

There are no particular limitations on the weight average molecular weight of the polyolefin-based thermoplastic resin, but the weight average molecular weight is usually selected in a range of 10,000 to 5,000,000, and preferably selected in a range of 50,000 to 800,000. Furthermore, there are no particular limitations on the specific gravity and melt index of the polyolefin-based thermoplastic resin, but the specific gravity is usually selected in a range of 0.80 to 0.95 g/cm$^3$, and preferably selected in a range of 0.85 to 0.94 g/cm$^3$, and the melt index usually selected in a range of 1 to 1,000 g/10 minutes, and preferably selected in a range of 3 to 500 g/10 minutes as a value measured according to ASTM D-1238 (G conditions, 200° C., 5 kg).

There are no particular limitations on the content of the polyolefin-based thermoplastic resin in the composition for a stretchable film of the present invention, but the content of the polyolefin-based thermoplastic resin is preferably 3 to 50 parts by weight, more preferably 5 to 40 parts by weight, and even more preferably 8 to 30 parts by weight relative to 100 parts by weight of the block copolymer composition. Furthermore, the polyolefin-based thermoplastic resin may be used singly, or two or more kinds may be used in combination.

Furthermore, there are no particular limitations on the melt index of the entire composition for a stretchable film of the present invention, but the melt index is usually 1 to 1,000 g/10 minutes, preferably 3 to 700 g/10 minutes, and more preferably 5 to 500 g/10 minutes as a value measured according to ASTM D-1238 (G conditions, 200° C., 5 kg). When the melt index is in this range, the composition for a stretchable film acquires a particularly satisfactory formability.

The composition for a stretchable film of the present invention may contain components other than the block copolymer composition and the polyolefin-based thermoplastic resin, and for example, additives such as, a tackifier resin, a softening agent, an antioxidant, an antibacterial agent, a light stabilizer, an ultraviolet absorber, a dye, a lubricating agent, a cross-linking agent, and a cross-linking promoting agent, may be incorporated as necessary.

There are no particular limitations on the method of mixing the block copolymer composition and the polyolefin-based thermoplastic resin or various additives upon preparation of the composition for a stretchable film of the present invention, and examples include a method of dissolving the respective components in a solvent, uniformly mixing the solutions, and then removing the solvent by heating or the like; and a method of heating, melting and mixing the respective components using a kneader or the like.

When a film is formed using the composition for a stretchable film such as described above as the material, the stretchable film of the present invention is obtained. There are no particular limitations on the method of forming to produce a stretchable film from the composition for a stretchable film of the present invention, and any conventionally known method for film forming can be applied. However, the composition for a stretchable film of the present invention exhibits its excellent formability particularly when extrusion molding is applied, and among others, extrusion molding using a T-die is particularly suitable. A specific example of extrusion molding using a T-die may be a method of extruding a block copolymer composition, which has been melted at a temperature of 150° C. to 250° C., through a T-die mounted in a single-screw extruder or a twin-screw extruder, and winding a film while cooling the film with a take-up roll. When the film is cooled with a take-up roll, the film may be stretched. Furthermore, upon obtaining the stretchable film of the present invention, a technique of spray coating the composition for a stretchable film of the present invention on a base material such as a non-woven fabric may also be employed.

The thickness of the stretchable film of the present invention may be adjusted in accordance with the use, but in the case of producing a film for hygiene products such as disposable diapers or sanitary products, the thickness is usually 0.01 to 50 mm, preferably 0.03 to 1 mm, and more preferably 0.05 to 0.5 mm.

The stretchable film of the present invention can be used alone in various applications. However, the stretchable film of the present invention is a film which embodies a feature so that when the film is laminated with another member, the film is not easily peeled off from the member. Therefore, the stretchable film of the present invention is preferably used in the form of being laminated with a non-woven fabric, a woven fabric, a plastic film, or a laminate thereof. For example, a stretchable gather member can be formed by slit processing the stretchable film of the present invention, subsequently applying a hot melt adhesive or the like on the slit processed film to produce a tape, adhering this tape to a non-woven fabric, a woven fabric, a plastic film or a laminate thereof while the tape is in contracted state, and relaxing the shrinkage of the tape.

The stretchable film of the present invention is particularly suitably used for obtaining a stretchable laminate by laminating with a non-woven fabric. That is, the stretchable laminate of the present invention is obtained by laminating a non-woven fabric on one surface or on both surfaces of the stretchable film of the present invention.

There are no particular limitations on the non-woven fabric that may be used to constitute the stretchable laminate of the present invention, but examples of the non-woven fabric used include non-woven fabrics produced by forming a fleece with a dry method, a wet method, a spun-bonding or melt-blown type method; and bonding the fleece by a thermal bonding method, a chemical bonding method, a needle punching method, a spun-lace method, a stitch bonding method, a steam jet method and the like.

There are no particular limitations on the technique of obtaining the stretchable laminate of the present invention, but it is preferable to use a technique of extruding the composition for a stretchable film on a non-woven fabric, or a technique of inserting the excluded composition for a stretchable film between non-woven fabrics to obtain a stretchable laminate, during the process of extrusion molding the stretchable film as described above. That is, the method for producing the stretchable laminate of the present invention is a method of continuously carrying out the steps of: extrusion-molding the composition for a stretchable film described above into a film form, and laminating a non-woven fabric on one surface or on both surfaces of the composition for a stretchable film in the extruded film form. When a stretchable laminate is produced as such, stretchable laminate can be obtained with high productivity, and the resulting stretchable laminate is such that the stretchable film and the non-woven fabric are not easily detachable in particular.

The stretchable laminate of the present invention is suitably used as a stretchable member described above, and is particularly suitably used as a stretchable member for the installation part for the mechanical fastener (ear portion) of disposable diapers or for hygiene products such as sanitary products. Furthermore, the stretchable laminate is also suitably used as a base material for elastic bandages, fixing belts for operating gowns, or the like.

EXAMPLES

Hereinafter, the present invention will be more specifically described by way of Examples and Comparative Examples. Furthermore, the units "parts" and "percentage (%)" in the Examples are on a weight basis, unless particularly stated otherwise.

Various analyses were made according to the following methods.

[Weight Average Molecular Weights of Block Copolymers and Block Copolymer Composition]

The weight average molecular weight was determined as a molecular weight relative to polystyrene standards, by high performance liquid chromatography using tetrahydrofuran as a carrier at a flow rate of 0.35 ml/min. For the apparatus, HLC-8220™ manufactured by Tosoh Corporation was used, and three columns of Shodex KF-404HQ™ manufactured by Showa Denko K.K. (column temperature 40° C.) connected together were used. A differential refractometer and an ultraviolet detector were used as the detectors, and the calibration of molecular weight was carried out using 12 samples of standard polystyrenes (from 500 to 3,000,000) manufactured by Polymer Laboratories, Ltd.

[Weight Ratios of Block Copolymers]

The weight ratios were determined from the peak area ratios corresponding to the respective block copolymers in the charts obtained by high performance liquid chromatography as described above.

[Weight Average Molecular Weight of Styrene Polymer Block]

A block copolymer was allowed to react with ozone and was reduced with lithium aluminum hydride according to the method described in Rubber Chem. Technol., 45, 1295 (1972), and thereby the isoprene polymer block of the block copolymer was decomposed. Specifically, the operation was carried out by the following procedure. That is, 300 mg of a sample was dissolved in a reaction vessel charged with 100 ml of dichloromethane that had been treated with a molecular sieve. This reaction vessel was placed in a cooling bath and was kept at −25° C. While oxygen was passed into the reaction vessel at a flow rate of 170 ml/min, ozone generated by an ozone generator was introduced into the reaction vessel. After a lapse of 30 minutes from initiating the reaction, the gas flowing out from the reaction vessel was introduced into an aqueous solution of potassium iodide, and thereby completion of the reaction was confirmed. Subsequently, 50 ml of diethyl ether and 470 mg of lithium aluminum hydride were introduced into another reaction vessel which had been substituted with nitrogen, and while the reaction vessel was cooled with ice water, the ozone-reacted solution was slowly added dropwise to this reaction vessel. Then, the reaction vessel was placed in a water bath and gradually heated, and hence the content of the reaction vessel was heated for 30 minutes at 40° C. to reflux. Subsequently, a small amount of diluted hydrochloric acid was added dropwise to the reaction vessel while the solution was stirred, and the dropwise addition was continued until the generation of hydrogen was almost undetectable. After this reaction, the solid product formed in this solution was separated by filtration, and the solid product was extracted with 100 ml of diethyl ether for 10 minutes. This extract was combined with the filtrate obtained at the time of separation by filtration, and the solvent was distilled off to obtain a solid sample. The sample thus obtained was analyzed for the weight average molecular weight according to the above-mentioned method for measuring the weight average molecular weight, and the value thereof was designated as the weight average molecular weight of a styrene polymer block.

[Weight Average Molecular Weight of Isoprene Polymer Block]

From the respective weight average molecular weights of the block copolymers determined as described above, the weight average molecular weight of a corresponding styrene polymer block was subtracted, and the weight average molecular weight of an isoprene polymer block was determined based on the calculated values.

[Styrene Unit Content of Block Copolymer]

The styrene unit content was determined based on the intensity ratio of the detection made by the differential refractometer and the ultraviolet detector in the analysis carried out by high performance liquid chromatography. Copolymers having different styrene unit contents were prepared in advance, and a calibration curve was produced using the copolymers.

[Styrene Unit Content of Block Copolymer Composition]

The styrene unit content was determined based on an analysis by proton NMR.

[Vinyl Bond Content of Isoprene Polymer Block]

The vinyl bond content was determined based on an analysis by proton NMR.

[Melt Indices of Block Copolymer Composition and Composition for a Stretchable Film]

The melt index was measured according to ASTM D-1238 (G conditions, 200° C., 5 kg). Furthermore, the melt index of the composition for a stretchable film was measured using a formed stretchable film as a sample.

[Film Formability of Composition for a Stretchable Film]

As an indicator of formability (forming stability) of the composition for a stretchable film, the elongational viscosity of the film was measured. The procedure of measurement was as follows. An ARES rheometer manufactured by TA Instruments Japan, Inc. was used as the measuring apparatus, and an ARES-EVF elongational viscosity fixture was used as the measurement fixture. The measurement was carried out under the conditions of an extension rate of $10^{-1}$ seconds, for a measurement time of 1.5 seconds, and at a measurement temperature of 200° C. Under these conditions, the elongational viscosities at 100% elongation and 350% elongation of the film were measured. If the elongational viscosity at 100% elongation is too high, it can be said that the film has an inferior formability. Furthermore, when the elongational viscosity at 350% elongation is lower than the elongational viscosity at 100% elongation (when the value of the ratio of elongational viscosity at 350% elongation/elongational viscosity at 100% elongation is less than 1), it can be said that the film has an inferior forming stability.

[Tensile Modulus of Stretchable Film]

Two sheets of a sample having 25 mm width were fabricated from a stretchable film (without a base material), and using the two sheets as the sample, the tensile modulus was measured in one sheet along the direction of melt flow at the time of forming, while the tensile modulus was measured in the other sheet along a direction perpendicular to the melt flow at the time of forming. The procedure of measurement was as follows. The sample was fixed on a Tensilon universal tester RTC-1210™ manufactured by Orientec Co., Ltd. at a distance between chucks of 40 mm under zero tension. The sample was then stretched to 200% at a rate of 300 mm/min, and subsequently, the sample was returned to the initial distance between chucks at a rate of 300 mm/min. Furthermore, the sample was elongated once again up to 200% at the identical rate, and then the sample was again returned to the initial distance between chucks at the identical rate. The tensile stress at 50% elongation in the process of the second returning to the initial distance between chucks was measured, and thus the tensile modulus of the stretchable film at 50% elongation was determined. It can be said that as the tensile modulus becomes higher, the stretchable film become to have a higher elastic modulus.

[Permanent Elongation of Stretchable Film]

The permanent elongation of a stretchable film without a base material was measured according to ASTM 412 using the Tensilon universal tester described above. Specifically, the sample form used was Die A, and the gauge length prior to elongation was elongation at 40 mm. The stretchable film was elongated at an elongation ratio of 100% and was maintained as such for 10 minutes. Subsequently, the stretchable film was suddenly contracted without elongating and returning, was left to stand for 10 minutes, and then the gauge length was measured. Thus, the permanent elongation was determined based on the following formula:

$$\text{Permanent elongation}(\%)=(L1-L0)/L0\times 100$$

L0: Gauge length prior to elongation (mm)

L1: Gauge length after contracting and standing for 10 minutes (mm)

Furthermore, in this measurement, two sheets of a stretchable film were used, and the permanent elongation was measured in one sheet along the direction of melt flow at the time of forming, while the permanent elongation was measured in the other sheet along a direction perpendicular to the melt flow at the time of forming. Thus, the respective values were recorded.

[Peeling Resistance of Stretchable Laminate]

A sample having a width of 25 mm was fabricated from a stretchable laminate formed from a stretchable film and a non-woven fabric, and the sample was fixed on the Tensilon tester at a distance between chucks of 25 mm under zero tension. The sample was then stretched to 100% at a rate of 300 mm/min, and subsequently, the sample was returned to the initial distance between chucks at a rate of 300 mm/min. This stretching was repeated 20 times, and then the sample was observed to determine whether peeling between the stretchable film and the non-woven fabric had occurred. When peeling could be confirmed, a needle having a diameter of 1 mm was inserted into the peeled portion. When peeling could not be observed, the peeling resistance was judged as "high", and when peeling was observed but a needle having a diameter of 1 mm could not be inserted, the peeling resistance was judged as "medium". When a needle having a diameter of 1 mm could be inserted, the peeling resistance was judged as "low".

Preparation Example 1

In a pressure resistant reactor, 23.3 kg of cyclohexane, 2.5 millimoles of N,N,N',N'-tetramethylethylenediamine (hereinafter, referred to as TMEDA), and 1.60 kg of styrene were added, and while the mixture was stirred at 40° C., 164.7 millimoles of n-butyllithium was added thereto. While the temperature was being elevated to 50° C., polymerization was carried out for an hour. The polymerization conversion ratio for styrene was 100%. Subsequently, while the temperature was controlled and hence was maintained at 50° C. to 60° C., 5.20 kg of isoprene was continuously added to the reactor for an hour. After completing the addition of isoprene, polymerization was carried out for another an hour. The polymerization conversion ratio for isoprene was 100%. Thereafter, 65.9 millimoles of dimethyldichlorosilane were added to the reactor, and a coupling reaction was carried out for two hours. Thus, a styrene-isoprene-styrene block copolymer was formed, which would serve as a block copolymer B. Thereafter, while the temperature was controlled and hence was maintained at 50° C. to 60° C., 3.20 kg of styrene was continuously added to the reactor over an hour. After completing the addition of styrene, polymerization was carried out for another hour, and thus an asymmetric styrene-isoprene-styrene block copolymer was formed, which would serve as a block copolymer A. The polymerization conversion ratio for styrene was 100%. Subsequently, 329.4 millimoles of methanol were added to the system as a polymerization terminator, the resulting mixture was thoroughly mixed, and the reaction was terminated. The amounts of the various agents used in the reaction are summarized in Table 1. A portion of the reaction liquid thus obtained was taken out, and the weight average molecular weights of the respective block copolymers and the block copolymer composition, the weight ratios of the respective block copolymers, the weight average molecular weights of the respective styrene polymer blocks, the weight average molecular weights of the respective isoprene polymer blocks, the styrene unit contents of the respective block copolymers, the styrene unit content of the block copolymer composition, and the vinyl bond content of the isoprene polymer block were determined. These values are presented in Table 2. As an antioxidant, 0.3 part of 2,6-di-tert-butyl-p-cresol was added and mixed with 100 parts of the reaction liquid obtained as described above (containing 30 parts of the polymer components). The mixed solution was added dropwise into hot water in small amounts, which was obtained by heating water to 85° C. to 95° C., to volatilize the solvent, and thereby a precipitate was obtained. This precipitate was pulverized and dried in hot air at 85° C., and thus a block copolymer composition of Preparation Example 1 was collected.

TABLE 1

| | Preparation Example | | | Comparative Preparation Example | | | |
|---|---|---|---|---|---|---|---|
| | 1 | 2 | 3 | 1 | 2 | 3 | 4 |
| Cyclohexane (kg) | 23.3 | 23.3 | 23.3 | 23.3 | 23.3 | 23.3 | 23.3 |
| TMEDA (millimoles) | 2.5 | 2.6 | 2.5 | 1.4 | 1.9 | 2.3 | 1.8 |
| n-butyllithium (millimoles) | 164.7 | 175.7 | 168.8 | 91.0 | 128.8 | 156.0 | 123.1 |
| Styrene (kg) [$1^{st}$ stage of polymerization] | 1.60 | 1.80 | 1.60 | 0.90 | 1.50 | 2.20 | 2.80 |
| Isoprene (kg) [$2^{nd}$ stage of polymerization] | 5.20 | 5.20 | 5.20 | 8.20 | 7.00 | 5.60 | 5.20 |
| Dimethyldichlorosilane (millimoles) [After $2^{nd}$ stage of polymerization] | 65.9 | 60.6 | 71.8 | — | — | — | 28.9 |
| Styrene (kg) [$3^{rd}$ stage of polymerization] | 3.20 | 3.00 | 3.20 | 0.90 | 1.50 | 2.20 | 2.00 |
| Methanol (millimoles) [After $3^{rd}$ stage of polymerization] | 329.4 | 351.4 | 337.7 | 182.0 | 257.6 | 312.0 | 246.2 |

TABLE 2

| | Preparation Example | | | Comparative Preparation Example | | | |
|---|---|---|---|---|---|---|---|
| | 1 | 2 | 3 | 1 | 2 | 3 | 4 |
| Block copolymer A | | | | | | | |
| Weight average molecular weight of styrene block (Ar1$^a$) | 10000 | 10400 | 10000 | — | — | — | 25000 |
| Weight average molecular weight of styrene block (Ar2$^a$) | 153000 | 85000 | 320000 | — | — | — | 60000 |
| Weight average molecular weight of isoprene block (D$^a$) | 52000 | 47600 | 47500 | — | — | — | 63000 |
| Vinyl bond content of isoprene block (D$^a$) (%) | 7 | 7 | 7 | — | — | — | 7 |
| Weight average molecular weight of block copolymer A | 215000 | 143000 | 377500 | — | — | — | 148000 |
| Styrene unit content of block copolymer A (%) | 77 | 72 | 82 | — | — | — | 56 |

TABLE 2-continued

|  | Preparation Example | | | Comparative Preparation Example | | | |
| --- | --- | --- | --- | --- | --- | --- | --- |
|  | 1 | 2 | 3 | 1 | 2 | 3 | 4 |
| Block copolymer B | | | | | | | |
| Weight average molecular weight of styrene block ($Ar^b$) | 10000 | 10400 | 10000 | 10500 | 13000 | 15000 | 25000 |
| Weight average molecular weight of isoprene block ($D^b$) | 52000 | 47600 | 47500 | 69500 | 45000 | 30000 | 63000 |
| Vinyl bond content of isoprene block ($D^b$) (%) | 7 | 7 | 7 | 7 | 7 | 7 | 7 |
| Weight average molecular weight of block copolymer B | 117000 | 116000 | 115000 | 160000 | 116000 | 90000 | 176000 |
| Styrene unit content of block copolymer B (%) | 23 | 26 | 23 | 18 | 30 | 44 | 35 |
| Block copolymer A/block copolymer B (weight ratio) | 42/58 | 45/55 | 37/63 | 0/100 | 0/100 | 0/100 | 56/44 |
| Block copolymer composition (whole) | | | | | | | |
| Weight average molecular weight | 149000 | 123000 | 186000 | 160000 | 116000 | 90000 | 161000 |
| Styrene unit content (%) | 48 | 48 | 48 | 18 | 30 | 44 | 48 |

Preparation Examples 2 and 3

The processes were carried out in the same manner as in Preparation Example 1, except that the amounts of styrene, n-butyllithium, TMEDA, dimethyldichlorosilane and methanol were respectively changed as indicated in Table 1, and thus block copolymer compositions of Preparation Examples 2 and 3 were collected. The same measurements as in Preparation Example 1 were carried out for these block copolymer compositions. The results are presented in Table 2.

Comparative Preparation Example 1

In a pressure resistant reactor, 23.3 kg of cyclohexane, 1.4 millimoles of TMEDA, and 0.90 kg of styrene were added, and while the mixture was stirred at 40° C., 91.0 millimoles of n-butyllithium was added thereto. While the temperature was being elevated to 50° C., polymerization was being carried out for an hour. The polymerization conversion ratio for styrene was 100% by weight. Thereafter, while the temperature was controlled and hence was maintained at 50° C. to 60° C., 8.20 kg of isoprene was continuously added to the reactor over an hour. After completing the addition of isoprene, polymerization was carried out for another hour. The polymerization conversion ratio for isoprene was 100%. Thereafter, while the temperature was controlled and hence was maintained at 50° C. to 60° C., 0.90 kg of styrene was continuously added to the reactor for an hour. After completing the addition of styrene, polymerization was carried out for another hour, and thus a styrene-isoprene-styrene block copolymer was formed. The polymerization conversion ratio for styrene was 100%. Thereafter, 182.0 millimoles of methanol were added to the system as a polymerization terminator, the resulting mixture was thoroughly mixed, and the reaction was terminated. A portion of the reaction liquid thus obtained was taken out, and the same measurements as in Preparation Example 1 were carried out. These values are indicated in Table 2. The subsequent operation was carried out in the same manner as in Preparation Example 1, and thus a block copolymer composition of Comparative Preparation Example 1 was collected.

Comparative Preparation Examples 2 and 3

The processes were carried out in the same manner as in Comparative Preparation Example 1, except that the amounts of styrene, n-butyllithium, TMEDA, isoprene and methanol were respectively changed as indicated in Table 1, and thus block copolymer compositions of Comparative Preparation Examples 2 and 3 were collected. The same measurements as in Preparation Example 1 were carried out for these block copolymer compositions. The results are presented in Table 2.

Comparative Preparation Example 4

The processes were carried out in the same manner as in Preparation Example 1, except that the amounts of styrene, n-butyllithium, TMEDA, dimethyldichlorosilane and methanol were respectively changed as indicated in Table 1, and thus a block copolymer composition of Comparative Preparation Example 4 was collected. The same measurements as in Preparation Example 1 were carried out for the block copolymer composition of Comparative Preparation Example 4. The results are presented in Table 2.

Example 1

The block copolymer composition obtained in Preparation Example 1 was supplied to a single-screw extruder equipped with an in-water hot cutting device at the front tip of the extruder, and the composition was fabricated into cylindrical pellets having, an average diameter of about 5 mm and an average length of about 5 mm. Subsequently, 100 parts of the pellets of the block copolymer composition and 25 parts of an ethylene-butene-1 copolymer (trade name: "EXCELLEN FX CX3502™", specific gravity 0.886 g/cm$^3$, melt index 4 g/10 minutes, manufactured by Sumitomo Chemical Co., Ltd.) produced using a metallocene catalyst were heated to melt and kneaded at 200° C. using a twin-screw extruder equipped with a T-die. The mixture was continuously extruded for 20 minutes to be inserted between PET release films, and thereby the pellets were formed into a film having a thickness of 0.2 mm. For the stretchable film of Example 1 thus obtained, the tensile modulus and the permanent elongation were measured, and this film was used as a sample to measure the melt index. Furthermore, an evaluation of film formability was carried out. These results are presented in Table 3. The details of the conditions for film forming are as follows.

Rate of composition treatment: 15 kg/hr

Rate of film take-up: 10 m/min

Extruder temperature: Adjusted to 140° C. for the feed port, and 160° C. for the T-die Screw: Full-flight Extruder L/D: 42

T-die: Width 300 mm, Lip 1 mm

TABLE 3

|  | Example 1 Preparation Example 1 | Example 2 Preparation Example 1 | Example 3 Preparation Example 2 | Example 4 Preparation Example 2 | Example 5 Preparation Example 2 | Example 6 Preparation Example 3 |
|---|---|---|---|---|---|---|
| Block copolymer composition used |  |  |  |  |  |  |
| Mixing Proportion (parts) |  |  |  |  |  |  |
| Block copolymer composition | 100 | 100 | 100 | 100 | 100 | 100 |
| EXCELLEN FX CX3502 ™ | 25 | — | 25 | — | — | 25 |
| AFFINITY EG8200G ™ | — | 25 | — | 43 | — | — |
| AFFINITY GA1950 ™ | — | — | — | — | 11 | — |
| Film properties |  |  |  |  |  |  |
| Tensile modulus at 50% in the direction perpendicular to melt flow (MPa) | 0.55 | 0.56 | 0.57 | 0.48 | 0.62 | 0.54 |
| Permanent elongation in the direction perpendicular to melt flow (%) | 9 | 6 | 8 | 10 | 5 | 9 |
| Tensile modulus at 50% elongation in the direction of melt flow (MPa) | 0.41 | 0.48 | 0.45 | 0.30 | 0.35 | 0.43 |
| Permanent elongation in the direction of melt flow (%) | 11 | 8 | 10 | 11 | 7 | 10 |
| Film formability |  |  |  |  |  |  |
| Melt index (g/10 min) | 18 | 17 | 17 | 21 | 15 | 21 |
| Elongational viscosity at 100% elongation (Pa·s) | 2300 | 2000 | 2400 | 2600 | 2200 | 2000 |
| Change ratio of elongational viscosity, at 350% elongation/at 100% elongation | 2.00 | 2.20 | 1.30 | 1.15 | 1.55 | 2.22 |
| Peeling resistance of stretchable laminate | High | High | High | High | High | High |

|  | Comparative Example 1 Comparative Preparation Example 1 | Comparative Example 2 Comparative Preparation Example 2 | Comparative Example 3 Comparative Preparation Example 3 | Comparative Example 4 Comparative Preparation Example 3 | Comparative Example 5 Comparative Preparation Example 4 |
|---|---|---|---|---|---|
| Block copolymer composition used |  |  |  |  |  |
| Mixing Proportion (parts) |  |  |  |  |  |
| Block copolymer composition | 100 | 100 | 100 | 100 | 100 |
| EXCELLEN FX CX3502 ™ | — | — | — | 25 | 25 |
| AFFINITY EG8200G ™ | — | — | — | — | — |
| AFFINITY GA1950 ™ | — | — | — | — | — |
| Film properties |  |  |  |  |  |
| Tensile modulus at 50% in the direction perpendicular to melt flow (MPa) | 0.40 | 0.51 | 1.25 | 0.40 | 0.45 |
| Permanent elongation in the direction perpendicular to melt flow (%) | 3 | 6 | 21 | 17 | 18 |
| Tensile modulus at 50% elongation in the direction of melt flow (MPa) | 0.42 | 0.33 | 0.96 | 0.12 | 0.10 |
| Permanent elongation in the direction of melt flow (%) | 3 | 20 | 35 | 21 | 20 |
| Film formability |  |  |  |  |  |
| Melt index (g/10 min) | 11 | 12 | 40 | 33 | 7 |
| Elongational viscosity at 100% elongation (Pa·s) | 5000 | 4400 | 6600 | 3300 | 4000 |
| Change ratio of elongational viscosity, at 350% elongation/at 100% elongation | 1.25 | 0.23 | 1.35 | 1.30 | 1.20 |
| Peeling resistance of stretchable laminate | Low | Low | Medium | High | High |

Furthermore, the processes were carried out in the same manner as in the formation of a stretchable film as described above, except that the base material was changed from the release film made of PET to a spun-bond non-woven fabric made of polypropylen (trade name: "PC-8020™", manufactured by Asahi Kasei Fibers Corporation), and thus a stretchable laminate of Example 1 in which a spun-bond non-woven fabric was laminated on both surfaces of the stretchable film, was obtained. This stretchable laminate of Example 1 was subjected to an evaluation of the peeling resistance. The results are presented in Table 3.

Examples 2 to 6 and Comparative Examples 1 to 5

The processes were carried out in the same manner as in Example 1, except that the type of block copolymer composition used and the type and amount of polyolefin-based thermoplastic resin were respectively changed as indicated in Table 3. Thus, the compositions for stretchable films, the stretchable films, and the stretchable laminates of Examples 2 to 6 and Comparative Examples 1 to 5 were obtained. These were subjected to the same measurements as in Example 1. The results are presented in Table 3. Here, in Table 3, "AFFINITY EG82000™" represents (ethylene-α-olefin copolymer, trade name: "AFFINITY EG8200G™", specific gravity 0.870 g/cm³, melt index 5 g/10 minutes, manufactured by The Dow Chemical Company), and "AFFINITY GA1950™" represents (low density polyethylene produced using a metallocene catalyst, trade name: "AFFINITY GA1950™", specific gravity 0.874 g/cm³, melt index 500 g/10 minutes, manufactured by The Dow Chemical Company).

From Table 3, it can be seen that the stretchable film of the present invention has both a high elastic modulus and a small permanent elongation, has excellent film formability, and is also excellent in peeling resistance when produced into a laminate with a non-woven fabric.

The invention claimed is:

1. A composition for a stretchable film, comprising a block copolymer composition containing a block copolymer A represented by the following general formula (A) and a block copolymer B represented by the following general formula (B), and a polyolefin-based thermoplastic resin:

  (A)

  (B), in the general formulas (A) and (B), $Ar1^a$ and $Ar^b$ each represent an aromatic vinyl polymer block having a weight average molecular weight of 6,000 to 20,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a single bond or a residue of a coupling agent; and n represents an integer of 2 or greater,
  wherein a weight ratio (A/B) of the block copolymer A and the block copolymer B in the block copolymer composition is 36/64 to 80/20.

2. The composition for a stretchable film according to claim 1, wherein a content of an aromatic vinyl monomer unit relative to all repeating units of polymer components in the block copolymer composition is 20% to 70% by weight.

3. The composition for a stretchable film according to claim 1, wherein the polyolefin-based thermoplastic resin is a polyethylene, or a copolymer of ethylene and another α-olefin.

4. A stretchable film formed by using the composition for a stretchable film according to claim 1.

5. A stretchable laminate obtained by laminating a non-woven fabric on one surface or on both surfaces of the stretchable film according to claim 4.

6. A method for producing a stretchable laminate, comprising continuously carrying out the steps of:
  extrusion-molding the composition for a stretchable film according to claim 1 into a film form, and
  laminating a non-woven fabric on one surface or on both surfaces of the composition for a stretchable film in the extruded film form.

* * * * *